United States Patent [19]

Hosoi et al.

[11] Patent Number: 4,879,202

[45] Date of Patent: Nov. 7, 1989

[54] RADIATION IMAGE STORAGE PANEL AND PROCESS FOR THE PREPARATION OF THE SAME

[75] Inventors: Yuichi Hosoi, Chigasaki; Satoshi Arakawa, Minami-ashigara; Kenji Takahashi, Odawara, all of Japan

[73] Assignee: Fuji Photo Film Co., Ltd., Kanagawa, Japan

[21] Appl. No.: 72,698

[22] Filed: Jul. 13, 1987

[30] Foreign Application Priority Data

| | | | |
|---|---|---|---|
| Jul. 11, 1986 | [JP] | Japan | 61-163284 |
| Feb. 2, 1987 | [JP] | Japan | 62-22032 |
| Jul. 1, 1987 | [JP] | Japan | 62-166130 |
| Jul. 3, 1987 | [JP] | Japan | 62-167630 |

[51] Int. Cl.$^4$ .......................... G03C 5/16; G01T 1/00; G01J 1/58

[52] U.S. Cl. .................................... 430/139; 430/198; 430/495; 250/327.2; 250/484.1; 250/486.1; 250/488.1

[58] Field of Search ........................ 430/139, 495, 198; 250/327.2 A, 484.1 B, 327.2 B, 486.1, 487.1, 488.1; 252/301.4 M, 301.4 R, 301.36

[56] References Cited

U.S. PATENT DOCUMENTS

| | | | |
|---|---|---|---|
| 3,988,252 | 10/1976 | Ferretti | 252/301.4 H |
| 4,021,588 | 5/1977 | Royce et al. | 427/215 |
| 4,076,897 | 2/1978 | Joiner | 250/483.1 |
| 4,309,481 | 1/1982 | Wakatsuki et al. | 252/301.4 R |
| 4,488,983 | 12/1984 | Brixner | 252/301.4 H |
| 4,508,636 | 4/1985 | Ochiai | 252/301.36 |
| 4,532,071 | 7/1985 | Nakamura et al. | 252/301.4 H |
| 4,571,496 | 2/1986 | Arakawa et al. | 250/484.1 |
| 4,604,526 | 8/1986 | Kitada et al. | 250/484.1 |
| 4,717,590 | 1/1988 | Wolfe et al. | 427/68 |

*Primary Examiner*—Paul R. Michl
*Assistant Examiner*—Lee C. Wright
*Attorney, Agent, or Firm*—Gerald J. Ferguson, Jr.

[57] ABSTRACT

A radiation image storage panel comprising a phosphor layer which comprises a stimulable phosphor, in which said phosphor layer consists essentially of a sintered stimulable phosphor and has a relative density of not less than 70%. Processes for the preparation for the same are also disclosed.

29 Claims, 7 Drawing Sheets

Fig.1-a
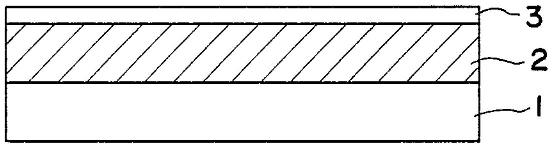
Fig.1-b
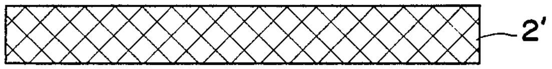
Fig.1-c
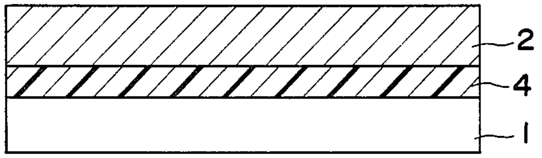
Fig.1-d
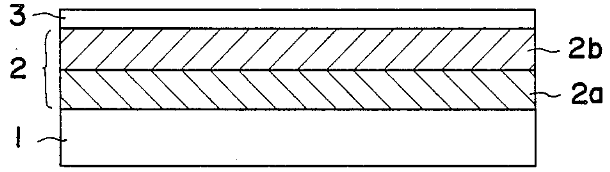

RADIATION IMAGE STORAGE PANEL AND PROCESS FOR THE PREPARATION OF THE SAME

BACKGROUND OF THE INVENTION

1. Field of the Invention

The present invention relates to a radiation image storage panel employed in a radiation image recording and reproducing method utilizing a stimulable phosphor, and a process for the preparation of said panel.

2. Description of the Prior Art

For obtaining a radiation image, a radiation image recording and reproducing method utilizing a stimulable phosphor as described, for instance in U.S. Pat. No. 4,239,968, has been proposed and practically used. In the method, a radiation image storage panel comprising a stimulable phosphor (i.e., stimulable phosphor sheet) is employed, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals on a recording material such as a photographic film or a display device such as CRT.

According to this method, a radiation image is obtainable with a sufficient amount of information by applying a radiation to an object at considerably smaller dose, as compared with a conventional radiography employing a combination of a radiographic film and a radiographic intensifying screen. The method is of great value especially when the method is used for medical diagnosis.

The radiation image storage panel employed in the above-described method has a basic structure comprising a support and a phosphor layer provided on one surface of the support. When the phosphor layer is self-supporting, the support is not always necessary. Further, a transparent film of a polymer material is generally provided on the free surface (surface not facing the support) of the phosphor layer to keep the phosphor layer from chemical deterioration or physical shock.

The phosphor layer generally comprises a binder and a stimulable phosphor dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore. It is desired for the radiation image storage panel employed in the method to have a high sensitivity and provide an image of high quality (high sharpness, high graininess, etc.), as well as the radiographic intensifying screen employed in the conventional radiography.

The sensitivity of the radiation image storage panel is essentially determined by the total amount of stimulated emission given by the stimulable phosphor contained therein, and the total emission amount varies depending upon not only the emission luminance of the phosphor per se but also the content of the phosphor in the phosphor layer. The large content of the phosphor also results in the increase of absorption of a radiation such as X-rays, so that the panel has a higher sensitivity and provides an image improved in quality (especially graininess). On the other hand, when the content of the phosphor is the same, the panel provides an image of high sharpness as the phosphor layer is charged densely therewith, because the phosphor layer can be made thin to reduce the spread of the stimulating rays owing to the scattering.

The phosphor layer has been usually formed by adding stimulable phosphor particles and a binder to an appropriate solvent to prepare a coating dispersion and then applying the coating dispersion onto a support or a sheet using a known coating means such as a doctor blade or a roll coater to dry. The formed phosphor layer comprising the binder and the stimulable phosphor dispersed therein has a relative density (proportion by volume of the phosphor occupying the phosphor layer) limited to approx. 60%. Further, since the phosphor layer having the binder contains a great number of air bubbles, the stimulating rays and the emitted light tend to scatter.

To increase the content of the phosphor in the phosphor layer without making the thickness thereof large (i.e., a method for increasing the relative density of the phosphor layer), there has been known a method of compressing a phosphor layer (or a phosphor layer and a support) using a compression means such as a calender roll or a hot press (U.S. patent application Ser. No. 568,416). The obtained phosphor layer has the relative density enhanced and contains more phosphor particles than the conventional one in the same thickness. However, the phosphor is strained by the compression and it is apt to lower the sensitivity of the panel (referred to as "pressure desensitizing").

As for a method for forming a phosphor layer which contains no binder but a stimulable phosphor only, there is described in U.S. Pat. No. 3,859,527 that a temporary storage medium comprises a hot pressed phosphor, and in Japanese Patent Provisional Publication No. 61(1986)-73100 (the amendment filed on Sept. 11, 1985 for Japanese Patent Application No. 59(1984)-196365) that a phosphor layer is formed by a firing process. However, both the description merely indicates that the hot press process and the firing process can be employed to form the phosphor layer.

SUMMARY OF THE INVENTION

It is an object of the present invention to provide a radiation image storage panel which is enhanced in the sensitivity and a process for the preparation of the same.

It is another object of the present invention to provide a radiation image storage panel which gives an image improved in quality, especially in the sharpness, and a process for the preparation of the same.

It is a further object of the present invention to provide a radiation image storage panel which has a high sensitivity and gives an image improved in the sharpness, and a process for the preparation of the same.

The present invention provides:

[1] a radiation image storage panel having a phosphor layer which comprises a stimulable phosphor, in which said phosphor layer consists essentially of a sintered stimulable phosphor and has a relative density of not less than 70%;

[2] a process for the preparation of a radiation image storage panel which has a phosphor layer comprising a stimulable phosphor, which comprises steps of molding a phosphor layer-forming material containing a stimulable phosphor into a sheet and sintering the molded product to form a phosphor layer;

[3] a process for the preparation of a radiation image storage panel which has a phosphor layer comprising a stimulable phosphor, which comprises steps of molding a phosphor layer-forming material containing a stimulable phosphor into a sheet, sintering the molded product and immersing the sintered product in a liquid containing a colorant capable of absorbing at least a portion of stimulating rays for the stimulable phosphor to form a colored phosphor layer;

[4] a process for the preparation of a radiation image storage panel which has a phosphor layer comprising a stimulable phosphor, which comprises steps of molding at least two phosphor layer-forming materials containing stimulable phosphors of mean diameters different from each other into a multi-layer sheet in such a manner that the materials are arranged in order of the mean diameter of the stimulable phosphor, and sintering the molded product to form a phosphor layer composed of at least two layers, the relative density of each layer becoming large in the direction perpendicular to the panel plane; and

[5] a process for the preparation of a radiation image storage panel which has a phosphor layer comprising a stimulable phosphor, which comprises steps of molding at least two phosphor layer-forming materials containing stimulable phosphors and further additives of different kinds and/or in different amounts including 0 from each other into a multi-layer sheet, and sintering the molded product to form a phosphor layer composed of at least two layers, the relative density of each layer becoming large in the direction perpendicular to the panel plane.

The term "relative density of phosphor layer" used herein means ratio of the volume of a phosphor occupying the phosphor layer to the whole volume of the phosphor layer.

BRIEF DESCRIPTION OF THE DRAWINGS

FIG. 1 is cross-sectional views showing embodiments of the radiation image storage panel according to the present invention.

DETAILED DESCRIPTION OF THE INVENTION

Figure 2:
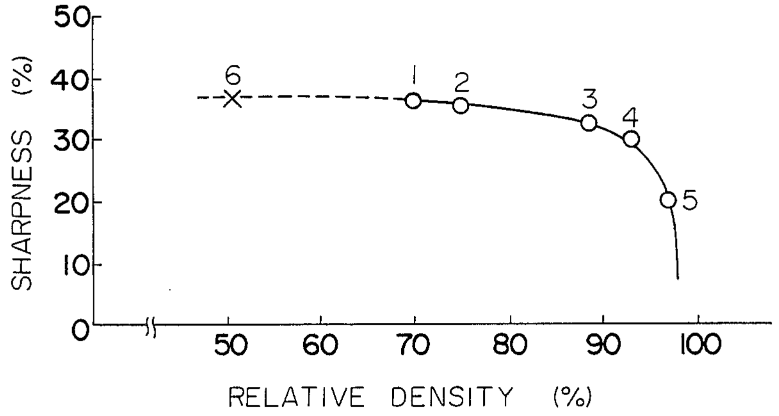
FIG. 2 graphically shows a relationship between the relative density and the sharpness with respect to the radiation image storage panels according to the present invention (measured points 1 to 5) and the conventional radiation image storage panel (measured point 6).

In the present invention primarily, a phosphor layer of a radiation image storage panel substantially consists of a sintered stimulable phosphor, having a relative density of not less than 70% to charge the phosphor layer with the phosphor at a high density, whereby the sensitivity of the panel is remarkably enhanced.

The phosphor layer is basically formed by the process (sintering process) which comprises molding a phosphor layer-forming material containing a stimulable phosphor into a sheet and sintering the obtained molded product, to obtain a phosphor layer at a relative density of not less than 70% consisting essentially of the phosphor. Ingredients (for example, a binder) other than the stimulable phosphor are not used in said process, and otherwise, even when the other ingredients are used, they are fired out during the sintering procedure, to give a phosphor layer composed of only the phosphor. The phosphor is sintered and packed densely as a whole to give a phosphor layer of the high relative density.

Accordingly, the phosphor layer obtained by the process of the invention does not contain the binder, in which air bubbles are reduced and the large amount of the phosphor exists, as compared with a phosphor layer at the same thickness which is obtained by the conventional coating process, so that the amount of the stimulated emission given by the phosphor layer is increased. The amount of a radiation absorbed by the phosphor layer is increased, which also brings about the increase of the emission amount to enhance the sensitivity. The reduction of air bubbles (pores) in the phosphor layer results in the decrease of scattering of emitted light, so that the detection efficiency of the emitted light is increased and the panel has the higher sensitivity.

Further, the thickness of the phosphor layer can be made smaller when the sensitivity of the panel of the invention is the same as that of the conventional panel, so that the panel of the invention can provide an image of high sharpness. Especially, the high sensitivity and the high sharpness are given to the panel when the phosphor layer thereof has a relative density in the specific range.

The increase of the absorption amount of a radiation per a phosphor layer also results in reducing the quantum noise of the radiation, to give an image of good graininess.

In one aspect of the invention, the phosphor layer is colored with a specific colorant as well as charged with a stimulable phosphor at a high density, whereby the radiation image storage panel has the high sensitivity and provides an image improved in the quality.

More in detail, the high packing density of the phosphor in the phosphor layer formed by the above-mentioned sintering process enables the phosphor layer to be thinner than the conventional one, and on the other hand, it results in making the mean free pass of stimulating rays therein longer. Scattered stimulating rays are spread widely to lower the sharpness of the image. According to the invention, the phosphor layer is impregnated with a colorant capable of at least a portion of the stimulating rays, so that the stimulating rays scattered and spread in the panel are absorbed by the colorant and the image quality such as sharpness can be prevented from lowering due to exciting the stimulable phosphor with the scattered stimulating rays.

Further, the phosphor layer can be easily colored to a desired extent by immersing the sintered phosphor layer (sintered product) in a liquid of the colorant and drying it. The colorant exists in the parts of grain boundaries and/or pores, being adsorbed on the surface of the phosphor, so that the phosphor layer is colored uniformly to give an image remarkably improved in sharpness.

In addition, the colored phosphor layer can be easily prepared according to the process (second process) of the invention.

Alternatively, a layer (sublayer) colored with the colorant, that is a colored layer, may be provided on one side of the phosphor layer since the sintered phosphor layer has the much higher transmissivity for light such as the stimulating rays than the conventional one comprising a phosphor and a binder. The stimulating rays scattered in the phosphor layer are efficiently absorbed by the colored layer and cut off to improve the sharpness.

Especially, the colored layer provided in the panel of the invention can contribute to the enhancement of the sharpness owing to the high transmissivity of the sintered phosphor layer, more than the colored subbing layer provided on the conventional coated phosphor layer. That is, as for the sintered phosphor layer, coloring the layer adjacent thereto is prominently effective, although it has been known to color various layers constituting the panel such as a support, a phosphor layer, an intermediate layer and a protective film.

Therefore, the radiation image storage panel of the invention can provide an image of higher sharpness than the conventional one when the sensitivity of both the panels is the same. On the contrary, the panel of the invention has higher sensitivity than the conventional one when the sharpness of the images provided thereby is the same.

In another aspect of the invention, the phosphor layer has a multi-layer structure, the relative density of which becomes large for each layer gradually and vice verse, in addition to charging the phosphor layer densely with the phosphor by sintering, whereby the efficiency of excitation with the stimulating rays and the efficiency of detection of the emitted light are increased to enhance the sensitivity of the panel.

In the formation of the phosphor layer, two or more of phosphor layer-forming materials which contain stimulable phosphors of particle sizes different from each other are arranged in the order of the mean diameter of the phosphor contained therein. Otherwise, the phosphor layer forming materials which contain different kinds of additives from each other and/or contain additives in different amounts from each other are arranged, for instance, in the order of the amount of the additive contained therein. The grain growth (crystal growth) of the phosphor in the resulting phosphor layers is promoted, namely the phosphor layers are sintered to a high degree, gradually in the direction perpendicular to the panel plane.

When reading out a radiation image from the panel, the irradiation of stimulating rays and the detection of stimulated emission are carried out on the side of the phosphor layer which is highly sintered and has a high relative density. The phosphor layer nearer the read-out side of the panel is more densely packed and has the higher relative density, so that said phosphor layer has a high transmissivity for the stimulating rays and the emitted light. On the other hand, the phosphor layer farther from the read-out side of the panel has the lower relative density so as to more scatter the stimulating rays. Accordingly, the stimulating rays entering the panel surface sufficiently reach the phosphor layer farthest therefrom (on the opposite side) and excite a lot of the phosphor, and the light emitted by said layer easily reaches the panel surface to be detected. The efficiencies of the excitation with the stimulating rays and of the detection of the emitted light are increased and the sensitivity of the panel can be further enhanced.

In addition, plural phosphor layers are simultaneously formed by sintering according to the process (third and fourth processes) of the invention, so that the panel can be easily prepared as compared with the case of forming plural layers independently followed by combining them. The phosphor layers are bonded with a high adhesion owing to integrating them in the form of a sintered product, and have the higher transmissivity than said case because of requiring no additional layer such as an adhesive layer therebetween.

Embodiments of the radiation image storage panel of the present invention having the above-described advantages are shown in FIG. 1.

FIGS. 1-*a* to 1-*d* are sectional views illustrating structures of the radiation image storage panel according to the invention. In FIG. 1-*a*, the panel comprises a support 1, a sintered phosphor layer 2 and a protective film 3, superposed in this order. In FIG. 1-*b*, the panel comprises a sintered and colored phosphor layer 2'. In FIG. 1-*c*, the panel comprises a support 1, a colored layer 4 and a sintered phosphor layer 2, superposed in this order. In FIG. 1-*d*, the panel comprises a support 1, a sintered phosphor layer 2 and a protective film 3, superposed in this order, and the phosphor layer 2 is composed of a layer **2*a* having a low relative density and a layer 2*b*** having a high relative density.

The above-mentioned embodiments are by no means given to restrict the panel of the invention, and any structure can be applied to the panel of the invention as far as the phosphor layer is sintered. For example, the phosphor layer may be composed of more than two layers and other additional layers such as a light-reflecting layer may be provided between the support and the phosphor layer.

The radiation image storage panel of the present invention, for instance, by a process described below.

A phosphor layer which is the characteristic requisite of the invention, basically, consists essentially of a sintered stimulable phosphor and has a relative density of not less than 70%. When the phosphor layer is composed of two or more layers, the whole of the phosphor layer has an average relative density of not less than 70%.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300 -500 nm when excited with stimulating rays in the wavelength region of 400-900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO.xAl_2O_3$:Eu, in which x is a number satisfying the condition of $0.8 \leqq x \leqq 10$, and $M^{2+}O.xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0<x+y \leqq 0.6$ and $xy \neq 0$, and a is a number satisfying the condition of $10^{-6} \leqq a \leqq 5 \times 10^{\times 2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively, as described in Japanese Patent Provisional Publication No. 55(1980)-160078;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 2 \times 10^{-1}$, respectively, as described in Japanese Patent Provisional Publication No. 57(1982)-23673;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in U.S. patent application Ser. No. 841,044;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively, as described in U.S. patent application Ser. No. 520,215;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0<y \leqq 0.1$, respectively, as described in U.S. patent application Ser. No. 502,648;

$BaFX.xNX':aEu^{2+}$, in which each of X and X' is at least one halogen selected from the group consisting of Cl, Br and I; and x and a are numbers satisfying the conditions of $0<x \leqq 2$ and $0<a \leqq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x \leqq 2$, $0<y$ $\leq 0.2$ and $0 < z \leq 10^{-2}$, respectively, as described in U.S. Pat. No. 4,505,989; and $M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in U.S. patent application Ser. No. 857,512;

$M^{II}X_2.aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, as described in U.S. patent application Ser. No. 834,886;

$M^{II}FX.aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leq 4.0$ and $0 < x \leq 0.2$, respectively, as described in U.S. patent application Ser. No. 814,028;

$M^{I}X:xBi$, in which $M^{I}$ is at least one alkali metal selected from the group consisting of Rb and Cs; X is at least one halogen selected from the group consisting of Cl, Br and I; and x is a number satisfying the condition of $0 < x \leq 0.2$, as described in U.S. patent application Ser. No. 846,919; and alkali metal halides described in Japanese Patent Provisional Publications No. 61(1986)-72087 and No. 61(1986)-72088.

The $M^{II}X_2.aM^{II}X'_2:xEu^{2+}$ phosphor described in U.S. patent application Ser. No. 660,987 may further contain the following additives in the following amount to 1 mol. of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leq 10.0$, as described in U.S. patent application Ser. No. 699,325;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leq b \leq 2.0$, $0 \leq c \leq 2.0$ and $0 \leq d \leq 2.0$, and $2 \times 10^{-5} \leq b+c+d$, as described in U.S. patent application Ser. No. 847,631;

bA, in which A is at least one oxide selected from the group consisting of $SiO_2$ and $P_2O_5$; and b is a number satisfying the condition of $10^{-4} \leq b \leq 2 \times 10^{-1}$, as described in U.S. patent application Ser. No. 727,972;

yB, in which y is a number satisfying the condition of $2 \times 10^{-4} \leq b \leq 2 \times 10^{-1}$, as described in U.S. patent application Ser. No. 727,974;

bSiO, in which b is a number satisfying the condition of $0 < b \leq 3 \times 10^{-2}$, as described in U.S. patent application Ser. No. 797,971;

$bSnX''_2$, in which X'' is at least one halogen selected from the group consisting of F, Cl, Br and I; and b is a number satisfying the condition of $0 < b \leq 10^{-3}$, as described in U.S. patent application Ser. No. 797,971;

$bCsX''.cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively, as described in U.S. patent application Ser. No. 850,715; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively, as described in U.S. patent application Ser. No. 850,715.

Among the above-described stimulable phosphors, the divalent europium activated alkaline earth metal halide phosphor and the rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

The phosphor layer can be formed, for instance, by the following process: the process comprises the steps of (1) molding a phosphor layer-forming material containing a stimulable phosphor into a sheet and (2) sintering the molded product.

In the first procedure of molding, a powder material comprising particles of the above-described stimulable phosphor is employed as the phosphor layer-forming material.

A dispersion containing stimulable phosphor particles and a binder can be also employed. The stimulable phosphor particles and the binder are added to an appropriate solvent, and they are well mixed to prepare a dispersion which comprises the phosphor particles dispersed homogeneously in a binder solution.

The binder is preferably selected from materials having excellent properties such as high dispersibility of phosphor and high exhalation in the succeeding sintering procedure. Examples of the binder include paraffin such as paraffin having 16–40 carbon atoms and a melting point of 37.8°–64.5° C.; wax such as natural wax (e.g., vegetable wax such as candelilla wax, carnauba wax, rice wax and Japan wax; animal wax such as beeswax, lanolin and whale wax; and mineral wax such as montan wax, ozocerite and ceresin) and synthetic wax (e.g., coal wax such as polyethylene wax and Fischer-Tropsch wax; and oil wax such as curing castor oil, fatty acid amide and ketone); and resins such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane cellulose acetate butylate, polyvinyl alcohol and linear polyester. Also employed are proteins such as gelatin, polysaccharides such as dextran and gum arabic.

Examples of the solvent employable in the preparation of the dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the dispersion is determined according to the nature of the phosphor employed or conditions in the molding and sintering procedures described hereinafter. Generally, the ratio therebetween is within the range of from 1:1 to 1:300 (binder: phosphor, by weight), preferably from 1:20 to 1:150.

The dispersion may contain a dispersing agent to assist the dispersibility of the phosphor particles therein. Examples of the dispersing agent include phthalic acid, stearic acid, caproic acid and a hydrophobic surface active agent.

In the case that the phosphor layer-forming material is a powder material, a molding tool is charged with the powder material to mold the material into a sheet. In the case that the phosphor layer-forming material is a dispersion, the dispersion is applied onto an appropriate substrate by a conventional coating method such as a method using a doctor blade to be molded into a sheet. Alternatively, the dispersion is introduced into the molding tool and molded into a sheet in the same manner as the case of the powder material. Examples of the substrate include plates of inorganic materials such as quartz, zirconia, alumina and silicon carbide.

During the molding procedure, the phosphor layer-forming material may be subjected to a compression treatment, especially in the case of the powder material. The compression treatment is carried out for instance by press molding, wherein the forming material is preferably applied with a pressure ranging from $1\times10^2$ to $1\times10^4$ kg./cm$^2$. The resulting phosphor layer is further enhanced in the relative density.

In the second place, the molded product in the form of sheet (i.e., molded sheet) is subjected to a sintering procedure.

The sintering is performed using a firing furnace such as an electric furnace. Temperature and time for the sintering are determined according to the kind of the phosphor layer-forming material, the shape and the state of the sheet-form molded product and the nature of the employed stimulable phosphor. When the molded sheet is made of the powder material comprising the stimulable phosphor, the sintering temperature is generally in the range of 500° to 1,000° C., preferably in the range of 700° to 950° C. The sintering time is generally in the range of 0.5 to 6 hours, preferably in the range of 1 to 4 hours. As the sintering atmosphere, there can be employed an inert atmosphere such as a nitrogen gas atmosphere and an argon gas atmosphere, or a weak reducing atmosphere such as a nitrogen gas atmosphere containing a small amount of hydrogen gas and a carbon dioxide atmosphere containing carbon monoxide.

When the molded sheet is made of the dispersion containing the stimulable phosphor and the binder or a dried film thereof, it is preferred that the binder therein is previously vaporized at a relatively low temperature (100°-450° C.) in an inert atmosphere such as a nitrogen gas atmosphere and an argon gas atmosphere, or an oxidizing atmosphere such as an oxygen gas atmosphere and an air atmosphere. Successively, the phosphor is sintered under the above-described conditions. Through the vaporization in the low temperature range, the components other than the phosphor such as the binder are vaporized or carbonized and further extinguish as a carbonic acid gas to be removed from the molded sheet. The time required for the low-temperature vaporization is preferably in the range of 0.5 to 6 hours.

The compression treatment may be carried out during the sintering procedure. That is, the molded sheet may be sintered under compression. This is particularly preferred when the molded sheet is made of the powder material.

The phosphor layer may be composed of two or more layers. The phosphor layer of a multi-layer structure can be formed as follows.

At least two phosphor layer-forming materials are prepared. It is required that the relative density of each phosphor layer is increased (or decreased, if viewed oppositely) gradually in the direction perpendicular to the panel plane. In other words, the sintering degree of the phosphor layers should be enhanced for each layer. For this purpose, for example, plural phosphor layer-forming materials which contain stimulable phosphors having mean diameters different from each other are prepared, or forming materials which contain different kinds of additives and/or contain additives in different amounts from each other, together with stimulable phosphors are prepared.

The grain growth of the stimulable phosphor is generally accelerated to sinter the phosphor to a high degree as the phosphor is in the from of fine particles, when the temperature in the sintering procedure is constant. Plural kinds of phosphor particles having mean diameters which vary within the range of 0.1-100 μm are employed. For example, two kinds of phosphor particles are employed, one having a mean diameter ranging 0.1-20 μm and the other having a meand diameter ranging 1-100 μm.

The stimulable phosphor is also sintered to a high degree by using a suitable additive therewith. The sintering degree of the phosphor can be controlled by the kind and the amount of the additive employed therewith. For example, when the phosphor is a divalent europium activated alkaline earth metal fluorohalide phosphor having the following basic formula:

$$M^{II}FX{:}xEu^{2+}$$

in which $M^{II}$ is at least one alkaline earth metal selected from the group consisting of Ba, Sr and Ca; X is at least one halogen selected from the group consisting of Cl, Br and I; and x is a number satisfying the condition of $0<x\leq0.2$, the additive of alkali metal halide serves as a flux in sintering and makes the grain growth of the phosphor promoted.

The alkali metal halide is the compound having the formula: $M^IX$ (in which $M^I$ is at least one alkali matal selected from the group consisting of Li, Na, K, Rb and Cs; and X is at least one halogen selected from the group consisting of F, Cl, Br and I), and NaX is preferably employed. The alkali metal halide is generally employed in an amount varying within the range of 0.01-10% by weight of the phosphor, preferably within the range of 0.05-3% by weight.

The means for preparing various phosphor layer-forming materials to gradate the sintering degree of the phosphor layers is not restricted by changing the particle size of stimulable phosphor and changing the kind or amount of additive. The additive is not restricted by the above-mentioned compound. Any other means is employed, provided that the the sintering degree of the phosphor layers varies.

The phosphor layer-forming materials are generally prepared in the form of dispersions. Each of the dispersions is applied onto a substrate and dried to form a dried film (referred to as "green sheet"), and then the green sheets are superposed and bonded by pressure to obtain a molded sheet of multi-layer structure. The bonding pressure generally ranges from $1\times10^1$ to $1\times10^4$ kg./cm$^2$. Otherwise, all the dispersions may be simultaneously and superposedly applied on the substrate and dried to obtain a molded multi-layer sheet. The dispersions may be together applied to form layers thereof simultaneously or may be applied one by one as fast as layers of the dispersions applied are not dried, and then the plural layers of the dispersions are together dried.

Powder materials comprising stimulable phosphor particles can be also employed. The powder materials are charged into a molding tool one after another to obtain a molded multi-layer sheet. In the case of a combination of dispersions and powder materials, for example, the powder materials are charged into the molding tool and subsequently the dispersions are poured thereinto. Otherwise, the dispersions are applied onto a substrate to form a green sheet and subsequently the powder materials are molded into a sheet thereon using the molding tool.

In the above-mentioned molding methods, the phosphor layer-forming materials are arranged in such an order that the grain growth of the stimulable phosphor contained therein is accelerated in the sintering procedure. For example, the forming materials are arranged in the order of the mean diameter of the phosphor. Otherwise, the forming materials are arranged in the order of the amount of the additive, or in such a manner that the material containing the additive is next to that containing no additive, or in the order of the capability of the additive to promote the grain growth.

The molded multi-layer sheet is then sintered under the above-mentioned conditions. The sintering is preferably conducted settling the molded sheet and keeping breathability thereof in order to prevent the deformation such as warpage and crook of the molded sheet during sintering.

The part of the molded sheet which contains the stimulable phosphor particles of the relatively small diameter has the grain growth thereof promoted and is to have a high density. The part which contains a mixture of the divalent europium activated alkaline earth metal fluorohalide phosphor ($M^{II}FX{:}xEu^{2+}$) and the alkali matal halide ($M^{I}X$) also has the grain growth thereof promoted to have a high density. $M^{I}X$ forms a solid solution together with the phosphor in the sintering procedure to remain in the sintered product.

The relative density of thus obtained sintered product (phosphor layer) is determined theoretically by the following formula (I):

$$V_p/V=aA/(a+b)\rho_x V \quad (I)$$

in which each symbol is as follows:

V: whole volume of phosphor layer, $V_p$: volume of phosphor,

A: whole amount of phosphor layer, $\rho_x$: density of phosphor, a: weight of phosphor, and b: weight of binder.

In the present specification, the relative density of the phosphor layer means a value calculated by the formula (I). In the formula (I) b can be taken as 0, since the binder hardly exists in the sintered phosphor layer. The relative density of the phosphor layer is required to be not less than 70%. From the viewpoint of the sensitivity and the sharpness, the relative density thereof is preferably in the range of 70 to 97%, more preferably in the range of 75 to 90%. In the case of the phosphor layer of a multi-layer structure, the average relative density of the whole phosphor layer satisfies said ranges.

The grain boundary size of the phosphor is preferably in the range of 1 to 100 $\mu$m.

The thickness of the phosphor layer(s) varies depending upon the characteristics of an aimed radiation image storage panel, etc. Generally, the thickness thereof is in the range of 20 $\mu$m to 1 mm, preferably in the range of 50 to 500 $\mu$m.

Further, the phosphor layer(s) (sintered product) may be subjected to a coloring procedure.

The colorant employable for coloring the sintered product absorbs at least a portion of the stimulating rays for causing the stimulable phosphor constituting the sintered product to give stimulated emission. The colorant preferably has such reflection characteristics that the mean reflectance thereof in the region of the stimulation wavelength of the stimulable phosphor is lower than the mean reflectance thereof in the region of the emission (stimulated emission) wavelength of the stimulable phosphor. From the viewpoint of the sharpness of the resultant image, it is desired that the mean reflectance of the colorant in the region of the stimulation wavelength is as low as possible. On the other hand, from the viewpoint of the sensitivity of the panel, it is desired that the mean reflectance of the colorant in the region of the emission wavelength is as high as possible. The term "reflectance" used herein means a reflectance measured by use of an integrating-sphere photometer.

Accordingly, the preferred colorant depends on the stimulable phosphor employed in the radiation image storage panel. From the viewpoint of practical use, the stimulable phosphor is desired to give stimulated emission in the wavelength region of 300-500 nm when excited with stimulating rays in the wavelength region of 400-900 nm as mentioned above. Employable for such a stimulable phosphor is a colorant having a body color ranging from blue to green, so that the mean reflectance thereof in the region of the stimulation wavelength of the phosphor is lower than the mean reflectance thereof in the region of the emission wavelength of the phosphor and the difference therebetween is as large as possible.

Examples of the colorant having a body color ranging from blue to green (dye and pigment) employed in the invention include the colorants disclosed in U.S. Pat. No. 4,394,581, that is: organic colorants such as Vari Fast Blue, Zapon Fast Blue 3G (available from Hoechst AG), Estrol Brill Blue N-3RL (available from Sumitomo Chemical Co., Ltd.), Sumiacryl Blue F-GSL (available from Sumitomo Chemical Co., Ltd.), D & C Blue No. 1 (available from National Aniline), Spirit Blue (available from Hodogaya Chemical Co., Ltd.), Oil Blue No. 603 (available from Orient Co., Ltd.), Kiton Blue A (available from Ciba-Geigy), Aizen Cathilon Blue GLH (available from Hodogaya Chemical Co., Ltd.), Lake Blue A.F.H. (available from Kyowa Sangyo Co., Ltd.), Rodalin Blue 6GX (available from Kyowa Sangyo Co., Ltd.), Primocyanine 6GX (available from Inahata Sangyo Co., Ltd.), Brillacid Green 6BH (available from Hodogaya Chemical Co., Ltd.), Cyanine Blue BNRS (available from Toyo Ink Mfg. Co., Ltd.), Lionol Blue SL (available from Toyo Ink Mfg. Co., Ltd.), and the like; and inorganic colorants such as ultramarine blue, cobalt blue, cerulean blue, chromium oxide, $TiO_2$-ZnO-CoO-NiO pigment, and the like.

Examples of the colorant employable in the present invention also include the colorants described in U.S. patent application Ser. No. 326,642, that is: organic metal complex salt colorants having Color Index No. 24411, No. 23160, No. 74180, No. 74200, No. 22800, No. 23150, No. 23155, No. 24401, No. 14880, No. 15050, No. 15706, No. 15707, No. 17941, No. 74220, No. 13425, No. 13361, No. 13420, No. 11836, No. 74140, No. 74380, No. 74350, No. 74460, and the like.

Among the above-mentioned colorants having a body color of from blue to green, particularly preferred are the organic metal complex salt colorants which show no emission in the longer wavelength region than that of the stimulating rays as described in the latter U.S. patent application Ser. No. 326,642.

The sintered product is colored by the following procedure. The above-mentioned colorant is dissolved or dispersed in an appropriate solvent to prepare a liquid (solution or dispersion) of the colorant. The solvent can be selected from those employable in the phosphor layer-forming material. In the liquid of the colorant the sintered product is then immersed in a short period of time (e.g., for several seconds to several minutes) and dried. When the molded sheet is formed on the substrate by coating, the sintered product thereof is colored after separating it from the substrate. Only the solvent is evaporated during the drying and thus, the colorant stably remains in the grain boundaries and/or the pores of the sintered product, being adsorbed on the surface of the phosphor. The coloring degree of the sintered product can be suitably controlled by changing the concentration of the colorant liquid and the immersing time.

Generally, the mean reflectance of the colored phosphor layer in the region of the stimulation wavelength is not higher than 95% of the mean reflectance of a phosphor layer equivalent to said phosphor layer except for being uncolored in the same region. The mean reflectance of the colored phosphor layer in the region of the emission wavelength is not lower than 30% of the mean reflectance of a phosphor layer equivalent to said phosphor layer except for being uncolored in the same region, and preferably not lower than 90% thereof.

Alternatively, a layer colored with the colorant may be provided on one surface of the phosphor layer instead of coloring the phosphor layer. In the case of the plural phosphor layers, the colored layer is provided on the surface of the phosphor layer having the lower relative density.

The colored layer (colored sublayer) can be formed on the phosphor layer by the following procedure: The above-mentioned colorant and a binder are added to an appropriate solvent and they are sufficiently mixed to prepare a coating dispersion (or solution) which comprises the colorant dispersed or dissolved in a binder solution. The binder and the solvent can be selected from those employable in the phosphor layer-forming material.

The ratio between the binder and the colorant in the coating dispersion is generally in the range of 10:1 to $10^6$:1 (binder: colorant, by weight) in the case of a dye colorant. The ratio therebetween is generally in the range of 1:10 to $10^5$:1 (binder: colorant, by weight) in the case of a pigment colorant.

The coating dispersion may further contain a light-reflecting material such as $TiO_2$ or $ZrO_2$ or a light-absorbing material such as carbon black. In the former case the resulting colored layer also serves as a light-reflecting layer, while in the latter case the colored layer also serves as a light-absorbing layer. Otherwise, adhesive agents such as a polyacrylic resin, a polyester resin, a polyurethane resin, a polyvinyl acetate resin and ethylene-vinyl acetate copolymers may be employed as the binder, and the resulting colored layer also serves as an adhesive layer when providing a support on the phosphor layer as described hereinbelow.

The coating dispersion is evenly applied onto the surface of the phosphor layer by a conventional method such as a method using a doctor blade, a roll coater or a knife coater, and subsequently the layer of the coating dispersion was heated to dryness to form a colored layer. The thickness of the colored layer is generally in the range of 3 to 50 $\mu m$.

The mean reflectance of the colored layer in the region of the stimulation wavelength is not higher than 95% of the mean reflectance of a layer equivalent to said layer except for being uncolored in the same region. The mean reflectance of the colored layer in the region of the emission wavelength is not lower than 30% of the mean reflectance of a layer equivalent to said layer except for being uncolored in the same region, and preferably not lower than 90% thereof.

In the radiation image storage panel of the invention, one or more layers constituting the panel other than the phosphor layer and/or the layer adjacent thereto, for example, a support and a protective film, may be further colored with the same colorant as employed for coloring said layers.

One surface of the phosphor layer (the surface of the phosphor layer having the lower relative density, in the case of the plural phosphor layers) may be provided with a light-reflecting layer, to enhance the sensitivity. The light-reflecting layer is a layer comprising a light-reflecting material.

Examples of the light-reflecting material include white pigments such as $Al_2O_3$, $ZrO_2$, $TiO_2$, $BaSO_4$, $SiO_2$, ZnS, ZnO, MgO, $CaCO_3$, $Sb_2O_3$, $Nb_2O_5$, $2PbCO_3.Pb(OH)_2$, $M^{II}FX$ (wherein $M^{II}$ is at least one element selected from the group consisting of Ba, Ca and Sr; and X is Cl and/or Br), lithopone ($BaSO_4$+ZnS), magnesium silicate, basic lead silicosulphate, basic lead phosphate and aluminum silicate. Among these materials, preferred are $Al_2O_3$, $ZrO_2$, $TiO_2$, $BaSO_4$, $SiO_2$, ZnS, ZnO and $M^{II}FX$ (wherein $M^{II}$ and X have the same meanings as defined above). The light-reflecting materials may be employed singly or in the combination of two or more of them.

The light-reflecting layer can be formed on the phosphor layer by the following procedure: The light-reflecting material and a binder are added to an appropriate solvent and they are sufficiently mixed to prepare a dispersion, or a powder material consisting of the light-reflecting material is prepared. The binder and the solvent can be selected from those employable in the phosphor layer-forming material. The ratio between the binder and the light-reflecting material in the dispersion is generally in the range of from 1:1 to 1:300 (binder:-material, by weight), and preferably in the range of from 1:20 to 1:150 by weight. The dispersion may further contain a dispersing agent. Then, the dispersion or the powder material is molded into a multilayer sheet together with the phosphor-layer forming material(s) and the molded sheet is sintered in the same manner as that in the formation of the phosphor layers. In the molding, when using the plural phosphor layerforming materials, the dispersion or the powder material is arranged on the side of the forming material in which the grain growth of the phosphor is less promoted.

The sintered light-reflecting layer and the sintered phosphor layer(s), being integrated, are formed at the same time. The thickness of the light-reflecting layer is preferably in the range of from 5 to 100 μm.

Alternatively, the light-reflecting layer may be formed on the phosphor layer or a support described below by applying the dispersion thereon.

One surface of the phosphor layer (or the colored layer or the light-reflecting layer) may be provided with a support. In the case of the plural phosphor layers, the support is provided on the surface of the phosphor layer having the lower relative density.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal foils such as aluminum foil and aluminum alloy foil; metal sheet; ceramic sheet; ordinary papers; baryta paper; resin-coated papers; pigment papers containing titanium dioxide or the like; and papers sized with polyvinyl alcohol or the like. The support may contain a light-absorbing material such as carbon black, or may contain a light-reflecting material such as $TiO_2$. The former is appropriate for preparing a high-sharpness type panel, while the latter is appropriate for preparing a high-sensitivity type panel.

One or more additional layers are occassionally provided between the support and the phosphor layer. For instance, a subbing layer or an adhesive layer may be provided by coating the support with a polymer material such as gelatin to enhance the adhesion therebetween. A light-absorbing layer containing a light-absorbing material such as carbon black may be provided on the support to improve the image quality (sharpness and graininess). The phosphor layer-side surface of the support (or the surface of an adhesive layer, etc. in the case that such layer is provided on the surface of the support) may be provided with protruded and depressed portions for enhancement of the sharpness, as described in U.S. patent application Ser. No. 496,278.

The support is provided on the phosphor layer by coating a surface of the support with an adhesive agent and fixing the phosphor layer thereon. Alternatively, the molded sheet may be placed on the support and then sintered so that the support can be provided at the same time as the phosphor layer is formed. When forming the molded sheet by coating, a support may be employed as the substrate. In these cases, the coloring of the phosphor layer is performed by immersing the support having the sintered product in the colorant liquid.

When the colored layer is provided between the support and the phosphor layer, the colored layer is formed on the support by coating and then the phosphor layer is fixed thereon by an adhesive agent. Otherwise, the coating dispersion for the colored layer which contains an adhesive agent is applied on the support and then the phosphor layer is directly fixed on the layer of the coating dispersion.

On the other surface of the phosphor layer (the surface of the phosphor layer having the higher relative density, in the case of the plural phosphor layers), a transparent protective film may be provided to protect the phosphor layer physically and chemically.

The transparent protective film can be formed on the phosphor layer by coating the surface of the phosphor layer with a solution of a transparent polymer such as a cellulose derivative (e.g. cellulose acetate or nitrocellulose) or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. The protective film can be also provided on the phosphor layer by beforehand preparing a film for forming a protective film from a plastic sheet made of polyethylene terephthalate, polyethylene, polyvinylidene chloride or polyamide; or a transparent glass sheet, followed by placing and fixing it onto the phosphor layer with an appropriate adhesive agent. The protective film preferably has a thickness within the range of approx. 0.1 to 20 μm.

Alternatively, the protective film may be formed together with the phosphor layer by sintering an inorganic material such as oxide (e.g. $SiO_2$, $Al_2O_3$), fluoride (e.g. $MgF_2$) or carbide (e.g. SiC) with the phosphor-layer forming material(s) in the same manner as that in the formation of the phosphor layers. The protective film may be provided on the phosphor layer by depositing said material thereon or by melting a low-boiling inorganic material under heating thereon to make a film.

The following examples further illustrate the present invention, but these examples are understood to by no means restrict the invention.

EXAMPLE 1

Divalent europium activated barium fluorobromide ($BaFBr:0.001Eu^{2+}$) phosphor particles were charged into a metal mold and compressed to obtain a molded sheet. The compression was done by means of a press molding machine (at pressure of $1\times10^3$ kg./cm$^2$ and at 25° C.).

Subsequently, the molded sheet was placed in a high-temperature electric furnace and sintered. The sintering was carried out at 750° C. for 1.5 hours in a nitrogen gas atmosphere. After the sintering, the sintered product was taken out of the furnace and allowed to stand for cooling, to form a phosphor layer consisting of the phosphor and having a thickness of 250 μm.

A polyethylene terephthalate sheet containing carbon black (support, thickness: 250 μm) was coated with a polyester adhesive agent and bonded to one surface of the phosphor layer through the adhesive agent.

On the other surface (surface not facing the support) of the phosphor layer was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a sintered phosphor layer and a protective film was prepared (see, FIG. 1-*a*).

EXAMPLES 2 to 6

The procedure of Example 1 was repeated except for changing the molding and sintering conditions to molding pressure and sintering temperature set forth in Table 1, to prepare various radiation image storage panels consisting essentially of a support, a sintered phosphor layer and a protective film.

TABLE 1

| | | Pressure ($kg./cm^2$) | Sintering Temperature (°C.) |
|---|---|---|---|
| Example | 2 | $10^3$ | 850 |
| | 3 | $10^3$ | 950 |
| | 4 | $3 \times 10^3$ | 750 |
| | 5 | $3 \times 10^3$ | 850 |
| | 6 | $3 \times 10^3$ | 950 |

EXAMPLE 7

To a mixture of divalent europium activated barium fluorobromide ($BaFBr:0.001Eu^{2+}$) phosphor particles and an acrylic resin was added methyl ethyl ketone to prepare a dispersion containing the phosphor particles and the binder in the ratio of 20:1 (phosphor: binder, by weight). The dispersion was sufficiently stirred by means of a propeller agitator to obtain a homogeneous coating dispersion having a viscosity of 35-50 PS (at 25° C.).

Subsequently, the coating dispersion was evenly applied to a Teflon sheet placed horizontally by using a doctor blade. After the coating was complete, the Teflon sheet having the coating dispersion was placed in an oven and dried at a temperature gradually rising from 25° to 100° C. The coated layer (dried film) was separated from the Teflon sheet and placed on a quartz plate. The quartz plate having the film was placed in a high-temperature electric furnace to perform vaporization of the binder and sintering of the phosphor. The vaporization of the binder was carried out at 400° C. for 4 hours in air and then, the sintering of the phosphor was carried out at 850° C. for 2 hours in a nitrogen gas atmosphere. The sintered product was taken out of the furnace and allowed to stand for cooling, to obtain a phosphor layer consisting of the phosphor and having a thickness of 250 μm.

A polyethylene terephthalate sheet containing carbon black (support, thickness: 250 μm) was coated with a polyester adhesive agent and bonded to one surface of the phosphor layer through the adhesive agent.

On the other surface (surface not facing the support) of the phosphor layer was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a sintered phosphor layer and a protective film was prepared.

EXAMPLE 8

The procedure of Example 7 was repeated except that the coating dispersion was poured into a stainless mold placed on a Teflon sheet to obtain a molded sheet instead of applying the coating dispersion onto the Teflon sheet, to prepare a radiation image storage panel consisting essentially of a support, a sintered phosphor layer and a protective film.

COMPARISON EXAMPLE 1

To a mixture of divalent europium activated barium fluorobromide ($BaFBr:0.001Eu^{2+}$) phosphor particles and a linear polyester resin were added successively methyl ethyl ketone and nitrocellulose (nitration degree: 11.5%), to prepare a dispersion containing the phosphor particles and the binder in the ratio of 20:1 (phosphor : binder, by weight). Tricresyl phosphate, n-buthanol and methyl ethyl ketone were added to the dispersion and the mixture was sufficiently stirred by means of a propeller agitator to obtain a homogeneous coating dispersion having a viscosity of 25-35 PS (at 25° C.).

Subsequently, the coating dispersion was evenly applied to a polyethylene terephthalate sheet containing carbon black (support, thickness: 250 μm) placed horizontally on a glass plate. The application of the coating dispersion was carried out using the doctor blade. After the coating was complete, the support having the coating dispersion was placed in the oven and heated at a temperature gradually rising from 25° to 100° C. Thus, a phosphor layer having a thickness of approx. 250 μm was formed on the support.

On the phosphor layer was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a phosphor layer and a protective film was prepared.

COMPARISON EXAMPLE 2

The procedure of Comparison Example 1 was repeated to obtain a sheet consisting of a support and a phosphor layer formed thereon. The sheet was then compressed using the press molding machine (at pressure of 10 $kg./cm^2$ and at 25° C.) to obtain a phosphor layer having a thickness of approx. 250 μm on the support.

On the phosphor layer was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a phosphor layer and a protective film was prepared.

COMPARISON EXAMPLES 3 AND 4

The procedure of Comparison Example 2 was repeated except for compressing the sheet at pressure set forth in Table 2, to prepare various radiation image storage panels consisting essentially of a support, a phosphor layer and a protective film.

TABLE 2

| | | Pressure ($kg./cm^2$) |
|---|---|---|
| Comparison Example | 3 | $10^3$ |
| | 4 | $3 \times 10^3$ |

The radiation image storage panels prepared as above were determined on the relative density of the phosphor layer by calculating based on the aforementioned formula (I). The densities of the phosphor and the binder were 5.18 g./$cm^3$ and 1.15 g./$cm^3$, respectively.

Then, the radiation image storage panels were evaluated on the sensitivity according to the following test. The panel was exposed to X-rays at voltage of 80 KVp and subsequently excited with a He-Ne laser beam (wavelength: 633 nm), to measure the sensitivity.

The results are set forth in Table 3.

TABLE 3

| | | Relative Density (%) | Relative Sensitivity |
|---|---|---|---|
| Example | 1 | 75 | 104 |
| | 2 | 80 | 170 |
| | 3 | 85 | 141 |
| | 4 | 85 | 126 |
| | 5 | 88 | 148 |
| | 6 | 88 | 148 |
| | 7 | 93 | 175 |
| | 8 | 90 | 170 |
| Com. Example | 1 | 50 | 100 |
| | 2 | 60 | 96 |
| | 3 | 70 | 89 |
| | 4 | 80 | 74 |

As is evident from the results set forth in Table 3, the radiation image storage panels prepared by the sintering process of the present invention (Examples 1 to 8) were remarkably enhanced in the sensitivity, as compared with the radiation image storage panel prepared by the conventional coating process (Comparison Example 1). The radiation image storage panels prepared by the known compression method (Comparison Examples 2 to 4) showed the even lower sensitivity than the panel prepared by the coating process (Comparison Example 1).

EXAMPLES 9 TO 12

The procedure of Example 7 was repeated except for changing the sintering conditions to sintering temperature set forth in Table 4, to prepare various radiation image storage panels consisting essentially of a support, a sintered phosphor layer and a protective film.

TABLE 4

| | | Sintering Temperature (°C.) |
|---|---|---|
| Example | 9 | 600 |
| | 10 | 650 |
| | 11 | 750 |
| | 12 | 950 |

The radiation image storage panels prepared as above were determined on the relative density of the phosphor layer by calculating based on the aforementioned formula (I).

Then, the radiation image storage panels were evaluated on the sensitivity according to the above-mentioned test and the sharpness of the image according to the following test. The panel was exposed to X-rays at voltage of 80 KVp through a CTF chart and subsequently scanned with a He-Ne laser beam (wavelength: 633 nm) to excite the phosphor contained in the panel. The light emitted by the phosphor layer of the panel was detected and converted to electric signals by means of a photosensor (photomultiplier having spectral sensitivity of type S5). From the electric signals, a radiation image of the CTF chart was reproduced as a visible image by an image reproducing apparatus. The contrast transfer function (CTF) value of the visible image was determined and the sharpness was evaluated by the CTF value at a spatial frequency of 2 cycle/mm.

Figure 3:
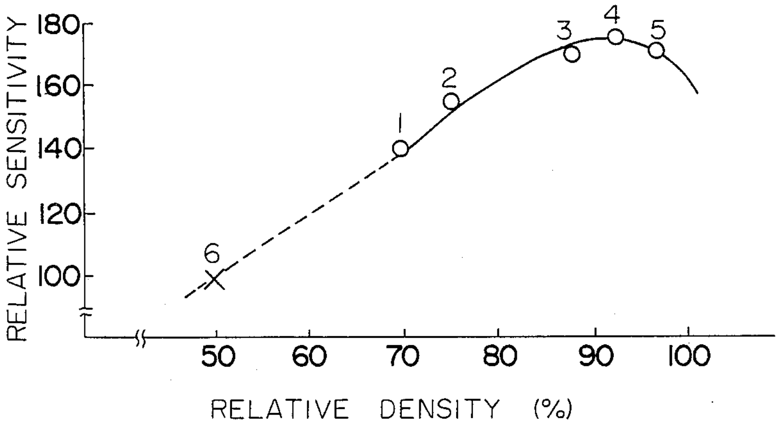
FIG. 3 graphically shows a relationship between the relative density and the relative sensitivity with respect to the radiation image storage panels according to the present invention (measured points 1 to 5) and the conventional radiation image storage panel (measured point 6).

The results are shown in FIGS. 2 and 3 and Table 5, together with the results of Example 7 and Comparison Example 1.

FIG. 2 shows a graph in which the relative density is plotted as abscissa and the sharpness is plotted as ordinate. FIG. 3 shows a graph in which the relative density is plotted as abscissa and the relative sensitivity is plotted as ordinate.

In each of FIGS. 2 and 3, measured points 1 to 5 (marked by ○ ) indicate the results on the panels according to the present invention (Examples 7, 9–12), respectively, and a measured point 6 (marked by X) indicates the result on the conventional panel (Comparison Example 1). The solid curve along the measured points 1 to 5 in FIG. 2 indicates a relationship between the relative density and the sharpness and that in FIG. 3 indicates a relationship between the relative densitiy and the relative sensitivity, with respect to the panel of the invention.

TABLE 5

| | | Relative Density (%) | Relative Sensitivity | Sharpness (%) |
|---|---|---|---|---|
| Example | 9 | 70 | 140 | 36 |
| | 10 | 75 | 155 | 34 |
| | 11 | 88 | 168 | 33 |
| | 7 | 93 | 175 | 30 |
| | 12 | 97 | 171 | 22 |
| Com. Example | 1 | 50 | 100 | 38 |

As is evident from the results shown in FIGS. 2 and 3 and Table 5, the radiation image storage panels having the phosphor layer at the relative density of 70–97% (Example 7, 9–12) according to the present invention were remarkably enhanced in the sensitivity and not so lowered in the sharpness, as compared with the conventional radiation image storage panel (Comparison Example 1). Especially, the panels having the phosphor layer at the relative density of 75–90% showed the high sensitivity and the high sharpness.

EXAMPLE 13

A dried film in the thickness of approx. 300 μm was formed on a Teflon sheet using the coating dispersion of Example 7 in the same manner as described in Example 7.

Subsequently, the dried film was separated from the Teflon sheet and placed on a quartz plate. The quartz plate having the film was placed in a high-temperature electric furnace to perform vaporization of the binder and sintering of the phosphor. The vaporization of the binder was carried out at 400° C. for 4 hours in air and then, the sintering of the phosphor was carried out at 750° C. for 1.5 hours in a nitrogen gas atmosphere. The sintered product consisting of the phosphor was taken out of the furnace and allowed to stand for cooling.

Independently, Vari Fast Blue (V.F.B.) was dispersed in ethanol to prepare a dispersion of the colorant at a concentration of 0.3 mg./l. The sintered product was immersed in the colorant dispersion for 1 min., and then taken up therefrom and dried to obtain a colored phosphor layer having a thickness of 200 μm.

Thus, a radiation image storage panel consisting of a sintered and colored phosphor layer was prepared (see, FIG. 1-*b*).

EXAMPLES 14 to 16

The procedure of Example 13 was repeated except for changing the concentration of the colorant dispersion to 3.0 mg./l, 30.0 mg./l and 300.0 mg./l, respectively, to prepare various radiation image storage panels consisting of a sintered and colored phosphor layer.

COMPARISON EXAMPLE 5

The procedure of Example 13 was repeated except for dispersing no colorant in ethanol (conc.: 0 mg./l), to prepare a radiation image storage panel consisting of a sintered phosphor layer.

COMPARISON EXAMPLE 6

A dried film (phosphor layer) in the thickness of approx. 200 μm was formed on a Teflon sheet using the coating dispersion of Example 7 in the same manner as described in Example 7.

Thus, a radiation image storage panel consisting of a phosphor layer was prepared.

The radiation image storage panels were determined on the relative density of the phosphor layer by calculating based on the aforementioned formula (I). The phosphor layers of Examples 13 to 16 and Comparison Example 5 had the relative density of 93% and that of Comparison Example 6 had the relative density of 50%.

Then, the radiation image storage panels were evaluated on the sharpness of the image and the sensitivity according to the above-mentioned test. The results are shown in FIG. 4 and set forth in Table 6.

Figure 4:
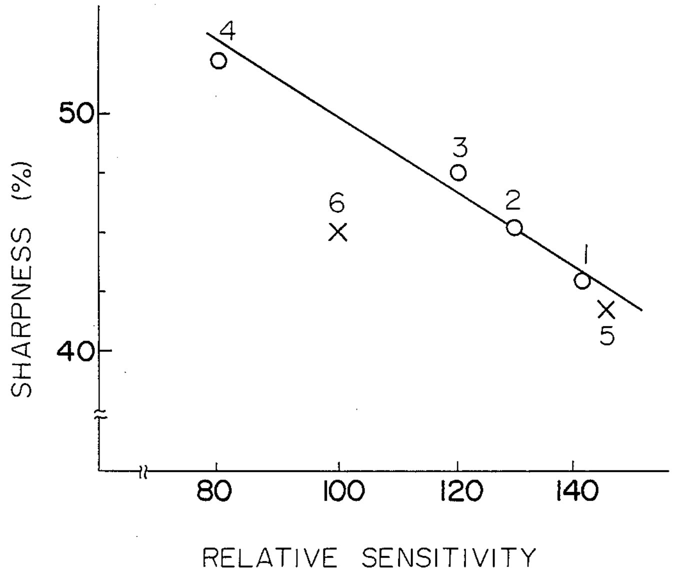
FIG. 4 graphically shows a relationship between the relative sensitivity and the sharpness with respect to the radiation image storage panels according to the present invention (measured points 1 to 4) and the radiation image storage panels for comparison (measured points 5 and 6).

FIG. 4 shows a graph in which the relative sensitivity is plotted as abscissa and the sharpness is plotted as ordinate.

In FIG. 4, measured points 1 to 4 (marked by ○ ) indicate the results on the panels according to the present invention (Examples 13–16), respectively, and measured points 5 and 6 (marked by X) indicate the results on the panels for comparison (Comparison Examples 5, 6), respectively. The straight line along the measured points 1 to 4 indicates a relationship between the relative sensitivity and the sharpness with respect to the panel of the invention.

TABLE 6

| | | Sharpness (%) | Relative Sensitivity |
|---|---|---|---|
| Example | 13 | 43.6 | 142 |
| | 14 | 45.3 | 130 |
| | 15 | 47.5 | 120 |
| | 16 | 52.2 | 80 |
| Com. Example | 5 | 42.1 | 146 |
| | 6 | 45.0 | 100 |

As is evident from the results shown in FIG. 4 and Table 6, all the radiation image storage panels having the sintered and colored phosphor layer according to the present invention (Examples 13–16) were remarkably enhanced in the sharpness, as compared with the radiation image storage panel having the sintered but uncolored phosphor layer for comparison (Comparison Example 5).

It was also evident that the panels according to the invention (Examples 13–16) provided images of higher sharpness than the known panel having the uncolored phosphor layer prepared by the conventional coating process (Comparison Example 6) when the sensitivity thereof was the same, and the panels of the invention had the higher sensitivity than the known panel when the sharpness was the same.

EXAMPLE 17

A phosphor layer consisting of the phosphor and having a thickness of 200 μm was obtained in the same manner as described in Example 7.

Independently, a blue pigment (trade name: PB-100, available from Daiichi Kasei Co., Ltd.), an acrylic resin and methyl ethyl ketone were sufficiently mixed in the following composition using a ball mill to prepare a coating dispersion.

| Composition of Coating Dispersion for Colored Layer | |
|---|---|
| Blue pigment | 5 g. |
| Acrylic resin | 10 g. |
| Methyl ethyl ketone | 90 g. |

The coating dispersion was evenly applied to a polyethylene terephthalate sheet (support, thickness: 250 μm) placed horizontally by using the doctor blade and dried under heating, to form a colored layer having a thickness of 20 μm on the support.

Subsequently, the colored layer provided on the support was coated with a polyester adhesive agent and bonded to one surface of the phosphor layer through the adhesive agent.

Thus, a radiation image storage panel consisting essentially of a suport, a colored layer and a sintered phosphor layer was prepared (see, FIG. 1-*c*).

The above-described procedure was repeated except for changing the thickness of the phosphor layer into 100 μm and 300 μm, repectively, to prepare two kinds of radiation image storage panels.

EXAMPLES 18

The procedure of Example 17 was repeated except that a polyethylene terephthalate sheet containing titanium dioxide in the same thickness is used as a support and no colored layer is formed on the support, to prepare three kinds of radiation image storage panels consisting essentially of a support and a sintered phosphor layer.

COMPARISON EXAMPLE 7

The procedure of Example 17 was repeated except that a phosphor layer is formed by applying the coating dispersion for a phosphor layer directly on the colored layer instead of sintering the dried film thereof, to prepare three kinds of radiation image storage panels consisting essentially of a support, a colored layer and a phosphor layer.

COMPARISON EXAMPLE 8

The procedure of Comparison Example 7 was repeated except that a polyethylene terephthalate sheet containing titanium dioxide in the same thickness is used as a support and the coating dispersion for a phosphor layer is applied on the support without forming a colored layer thereon, to prepare three kinds of radiation image storage panels consisting essentially of a support and a phosphor layer.

The radiation image storage panels were determined on the relative density of the phosphor layer by calculating based on the aforementioned formula (I). The phosphor layers of Examples 17 and 18 had the relative density of 93% and those of Comparison Examples 7 and 8 had the relative density of 50%.

Then, the radiation image storage panels were evaluated on the sensitivity and the sharpness of the image according to the above-mentioned test. The results are shown in FIGS. 5 and 6.

Figure 5:
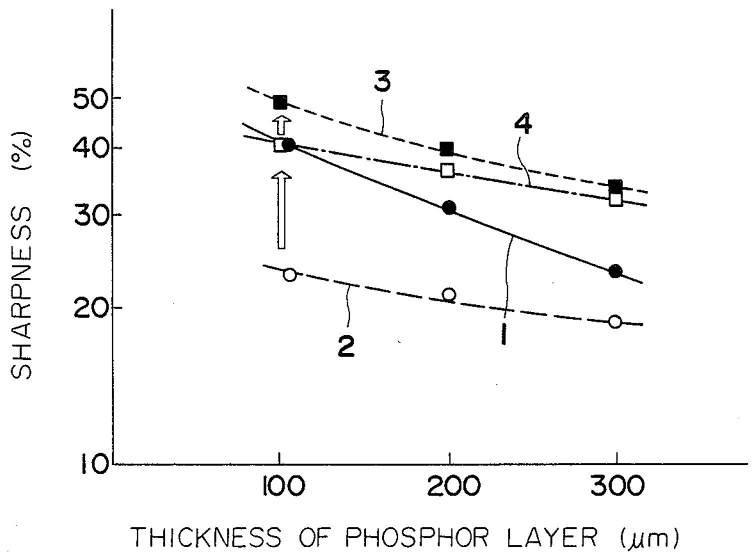
FIG. 5 graphically shows relationships between the thickness of the phosphor layer and the sharpness with respect to the radiation image storage panels according to the present invention (curves 1 and 2) and the radiation image storage panels for comparison (curves 3 and 4).
Figure 6:
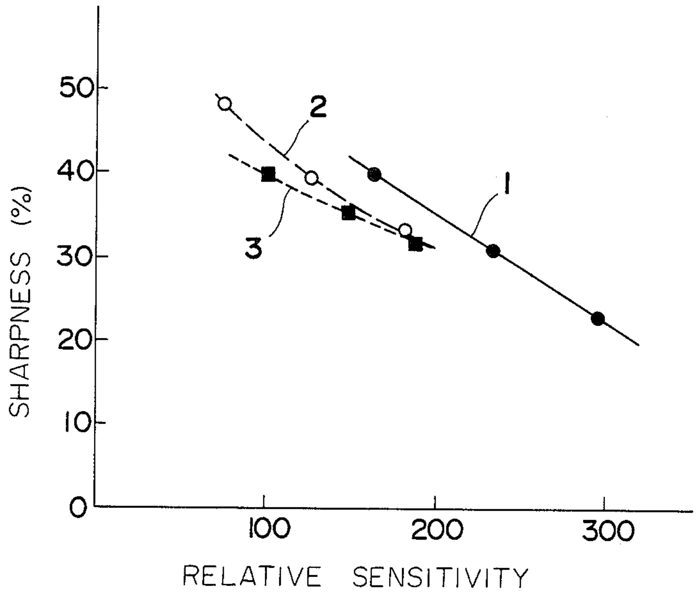
FIG. 6 graphically shows relationships between the relative sensitivity and the sharpness with respect to the radiation image storage panel according to the present invention (curve 1) and the radiation image storage panels for comparison (curves 2 and 3).

FIG. 5 shows a graph in which the thickness of the phosphor layer is plotted as abscissa and the sharpness is plotted as ordinate. In FIG. 5, Curve 1: panel of the invention having both the sintered phosphor layer and the colored layer (Example 17);

Curve 2: panel of the invention having only the sintered phosphor layer (Example 18);

Curve 3: known panel having both the coated phosphor layer and the colored layer (Com. Example 7); and Curve 4: conventional panel having only the coated phosphor layer (Com. Example 8). Arrows (⇑) in FIG. 5 indicate the increase of the sharpness depending on the provision of the colored layer.

FIG. 6 shows a graph in which the relative sensitivity is plotted as abscissa and the sharpness is plotted as ordinate. In FIG. 6, Curve 1: panel of the invention having both the sintered phosphor layer and the colored layer (Example 17);

Curve 2: known panel having both the coated phosphor layer and the colored layer (Com. Example 7); and Curve 3: conventional panel having only the coated phosphor layer (Com. Example 8).

As is evident from the results shown in FIG. 5, the radiation image storage panel provided with the colored layer according to the present invention (Curve 1) gave an image remarkably enhanced in the sharpness, as compared with the panel provided with no colored layer (Curve 2). The enhancement of the sharpness depending on the provision of the colored layer was much greater in the panel having the sintered phosphor layer (the arrow between Curves 1 and 2) than in the known panel having the coated one (the arrow between Curves 3 and 4).

As is evident from the results shown in FIG. 6, the radiation image storage panel having the sintered phosphor layer and the colored layer according to the present invention (Curve 1) gave an image of higher sharpness than the conventional panel having the coated phosphor layer (Curve 3) when the sensitivity thereof was the same, and the panel of the invention had the higher sensitivity than the conventional panel when the sharpness was the same. In the same way, the panel of the invention was better than the known panel having the coated phosphor layer and the colored layer (Curve 2).

EXAMPLE 19

Divalent europium activated barium fluorobromide phosphor particles ($BaFBr:0.001Eu^{2+}$, peak diameter in particle size distribution: 6 μm) were classified to obtain two kinds of phosphors having peak diameters of 4 μm and 8 μm in particle size distribution, respectively. To a mixture of each phosphor and an acrylic resin was added methyl ethyl ketone to prepare a dispersion containing the phosphor particles and the binder in the ratio of 20:1 (phosphor: binder, by weight). The dispersion was sufficiently stirred by means of a propeller agitator to obtain a homogeneous coating dispersion having a viscosity of 35–50 PS (at 25° C.).

Each of the coating dispersion was evenly applied to a Teflon sheet placed horizontally by using the doctor blade. After the coating was complete, the Teflon sheet having the coating dispersion was placed in an oven and dried at a temperature gradually rising from 25° to 100° C. The dried film in the thickness of 150 μm was separated from the Teflon sheet. The dried film containing the phosphor of the small particle diameter was superposed on the dried film containing the larger one and bonded by pressure of 100 kg./cm$^2$, to obtain a molded double-layer sheet.

Subsequently, the molded sheet was placed and held on a quartz plate, and the quartz plate was placed in a high-temperature electric furnace to perform vaporization of the binder and sintering of the phosphor. The vaporization of the binder was carried out at 400° C. for 4 hours in air and then, the sintering of the phosphor was carried out at 850° C. for 2 hours in a nitrogen gas atmosphere. The sintered product was taken out of the furnace and allowed to stand for cooling, to obtain a phosphor layer composed of two layers which consists of the phosphor and has a total thickness of 250 μm.

A polyethylene terephthalate sheet containing carbon black (support, thickness: 250 μm) was coated with a polyester adhesive agent and bonded to the lower surface of the phosphor layers through the adhesive agent.

On the upper surface of the phosphor layers was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, two sintered phosphor layers and a protective film was prepared (see, FIG. 1-*d*; 1: support, 2*a*: phosphor layer consisting of the phosphor in the peak diameter of 8 μm, 2*b*: phosphor layer consisting of the phosphor in the peak diameter of 4 μm, 3: protective film).

Figure 7:
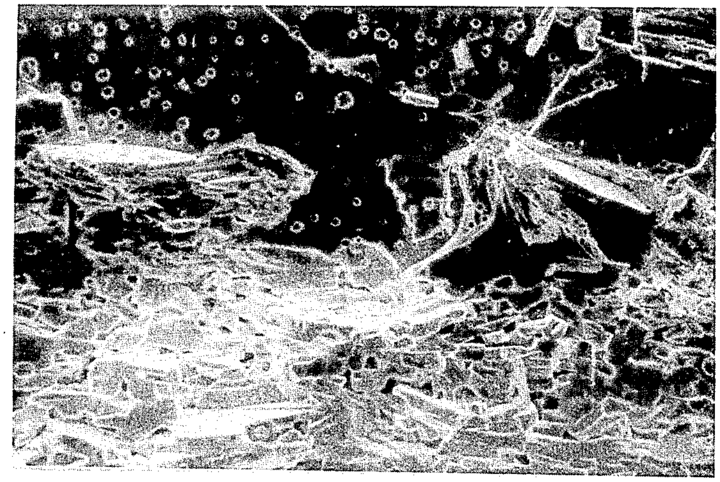
FIGS. 7 to 9 are photographs showing partial cross-sections of the phosphor layer of the radiation image storage panel according to the present invention, which are observed under a scanning electron microscope.
Figure 8:
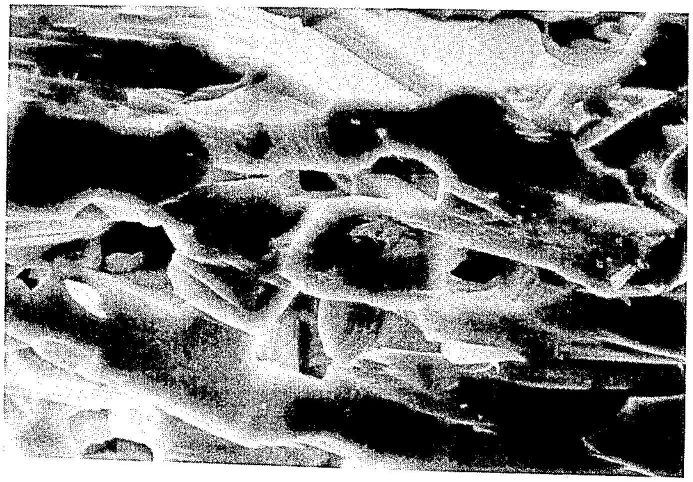
Figure 9:
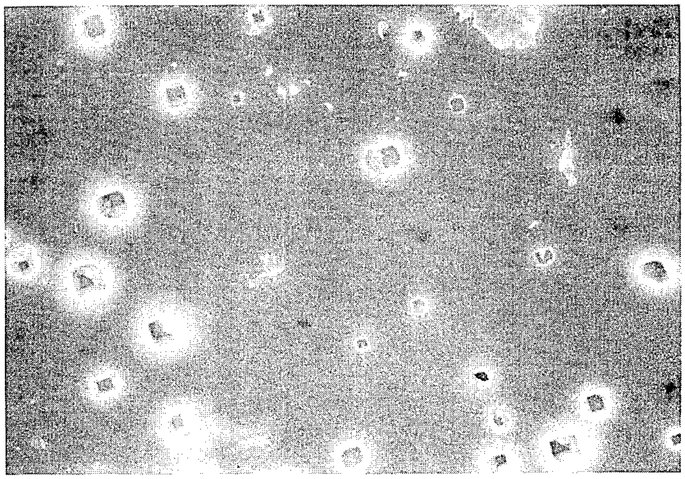

The obtained radiation image storage panel was observed under a scanning electron microscope and the phosphor layers were in the sintering state as shown in FIGS. 7 to 9.

FIGS. 7 to 9 are photographs of partial cross-section of the phosphor layers along the direction perpendicular to the panel plane. FIG. 7 shows the lower phosphor layer 2*a* and the upper phosphor layer 2*b*. FIGS. 8 and 9 respectively show the lower layer 2*a* and the upper layer 2*b*, which are obtained by partially enlarging FIG. 7.

It was confirmed from FIGS. 7 to 9 that the upper phosphor layer had the grain growth of the phosphor promoted remarkably and had the high relative density and that the lower phosphor layer had the grain growth thereof promoted less than the upper layer and was reduced in the relative density.

EXAMPLE 20

The procedure of Example 19 was repeated except for using the phosphor (peak diameter in the particle size distribution: 6 μm) before the classification to obtain a dried film in the thickness of 150 μm. The same procedure was repeated except for using said phosphor and sodium bromide (NaBr) in an amount of 0.3 wt. % of the phosphor to obtain a dried film in the same thickness. Subsequently, the dried film containing NaBr was superposed on the other one and bonded by pressure, to obtain a molded double-layer sheet.

A radiation image storage panel consisting essentially of a support, two sintered phosphor layers and a protective film was prepared using this molded sheet in the same manner as described in Example 19 (see, FIG. 1-*d*; 1: support, 2*a*: phosphor layer consisting of the BaFBr:$Eu^{2+}$ phosphor, 2*b*: phosphor layer consisting of the BaFBr:$Eu^{2+}$ phosphor and NaBr, 3: protective film).

The obtained radiation image storage panel was observed under the scanning electron microscope. It was confirmed from the observation that the upper phosphor layer had the grain growth of the phosphor promoted to have the high relative density and that the lower phosphor layer had the grain growth thereof less promoted to have the relative density lower than the upper layer.

EXAMPLE 21

The procedure of Example 19 was repeated except for using the phosphor (peak diameter in the particle size distribution: 6 μm) before the classification to obtain a dried film in the thickness of 300 μm. Subsequently, the dried film was compressed at pressure of 100 kg./$cm^2$ to obtain a molded sheet.

A radiation image storage panel consisting essentially of a support, a sintered phosphor layer and a protective film was prepared using this molded sheet in the same manner as described in Example 19 (see, FIG. 1-*a*).

Then, the radiation image storage panels were evaluated on the sensitivity according to the above-mentioned test. The sensitivity is represented by a relative value on the basis of Example 21 being 100. The results are set forth in Table 7.

TABLE 7

| | | Relative Sensitivity |
|---|---|---|
| Example | 19 | 130 |
| | 20 | 110 |
| | 21 | 100 |

As is evident from the results set forth in Table 7, the radiation image storage panels having two sintered phosphor layers according to the present invention (Examples 19 and 20) were enhanced in the sensitivity, as compared with the radiation image storage panel having one sintered phosphor layer (Example 21).

We claim:

1. A process for the preparation of a radiation image storage panel which has a phosphor layer comprising a stimulable phosphor, which comprises steps of molding a phosphor layer-forming material containing a stimulable phosphor into a sheet and sintering the molded product to form a phosphor layer.

2. The process as claimed in claim 1, in which said phosphor layer-forming material is a powder material comprising the stimulable phosphor, and the powder material is charged into a molding tool to obtain a molded product.

3. The process as claimed in claim 1, in which said phosphor layer-forming material is a dispersion containing the stimulable phosphor and a binder, and the dispersion is poured into a molding tool to obtain a molded product.

4. The process as claimed in claim 1, in which said phosphor layer-forming material is a dispersion containing the stimulable phosphor and a binder, and the dispersion is applied on a substrate to obtain a molded product.

5. The process as claimed in claim 2, in which the molded product comprising said powder material is sintered at a temperature ranging from 500° to 1,000° C. in an inert atmosphere or a reducing atmosphere.

6. The process as claimed in claim 5, in which said molded product comprising the powder material is sintered at a temperature ranging from 700° to 950° C. in an inert atmosphere or a reducing atmosphere.

7. The process as claimed in claim 3 or 4, in which the binder contained in the molded product comprising said dispersion is vaporized at a temperature ranging from 100° to 450° C. in an inert atmosphere or an oxidizing atmosphere, and then the molded product is sintered at a temperature ranging from 500° to 1,000° C. in an inert atmosphere or a reducing atmosphere.

8. The process as claimed in claim 7, in which said binder contained in the molded product comprising the dispersion is vaporized at a temperature ranging from 300° to 400° C. in an inert atmosphere or an oxidizing atmosphere, and then the molded product is sintered at a temperature ranging from 700° to 950° C. in an inert atmosphere or a reducing atmosphere.

9. The process as claimed in claim 1, in which said stimulable phosphor is a divalent europium activated alkaline earth metal halide phosphor.

10. A process for the preparation of a radiation image storage panel which has a phosphor layer comprising a stimulable phosphor, which comprises steps of molding a phosphor layer-forming material containing a stimulable phosphor into a sheet, sintering the molded product and immersing the sintered product in a liquid containing a colorant capable of absorbing at least a portion of stimulating rays for the stimulable phosphor to form a colored phosphor layer.

11. The process as claimed in claim 10, in which said colorant is a dye.

12. The process as claimed in claim 10, in which the mean reflectance of said colorant in the region of stimulation wavelength of the stimulable phosphor is lower than the mean reflectance thereof in the region of emission wavelength of the stimulable phosphor.

13. A process for the preparation of a radiation image storage panel which has a phosphor layer comprising a stimulable phosphor, which comprises steps of molding at least two phosphor layer-forming materials containing stimulable phosphors of mean diameters different from each other into a multi-layer sheet in such a manner that the materials are arranged in order of the mean diameter of the stimulable phosphor, and sintering the molded product to form a phosphor layer comprised of at least two layers, the relative density of each layer increasing in the direction perpendicular to the panel plane toward the read out side of the panel.

14. The process as claimed in claim 13, in which said phosphor layer-forming materials are two and the stimulable phosphors contained therein have mean diameters in the range of 0.1 to 20 μm and 1 to 100 μm, respectively.

15. The process as claimed in claim 13, in which said phosphor layer-forming materials are dispersions containing the stimulable phosphors and binders, and the dispersions are respectively applied on a substrate to form dried films and then the dried films are laminated to obtain a molded product of multi-layer.

16. The process as claimed in claim 13, in which said phosphor layer-forming materials are dispersions containing the stimulable phosphors and binders, and the dispersions are simultaneously applied on a substrate in a superposed form to obtain a molded product of multi-layer.

17. The process as claimed in claim 13, in which said phosphor layer-forming materials are powder materials comprising the stimulable phosphors, and the powder materials are charged into a molding tool one after another to obtain a molded product of multi-layer.

18. The process for the preparation of a radiation image storage panel which has a phosphor layer comprising a stimulable phosphor, which comprises steps of molding at least two phosphor layer-forming materials containing stimulable phosphors and further additives of different kinds and/or in different amounts including 0 from each other into a multi-layer sheet, and sintering the molded product to form a phosphor layer composed of at least two layers, the relative density of each layer increasing in the direction perpendicular to the panel plane toward the read out side of the panel.

19. The process as claimed in claim 18, in which said phosphor layer-forming materials containing additives in amounts different from each other are molded into the sheet in such a manner that the materials are arranged in order of the amount of the additive.

20. The process as claimed in claim 18, in which said phosphor layer-forming materials are two, which contain divalent europium activated alkaline earth metal fluorohalide phosphors and one of which further contains alkali metal halide.

21. The process as claimed in claim 20, in which said alkali metal halide is contained in the phosphor layer-forming material in an amount of 0.01–10% by weight of the phosphor.

22. The process as claimed in claim 18, in which said phosphor layer-forming materials are dispersions containing the stimulable phosphors and binders, and the dispersions are respectively applied on a substrate to form dried films and then the dried films are laminated to obtain a molded product of multi-layer.

23. The process as claimed in claim 18, in which said phosphor layer-forming materials are dispersions containing the stimulable phosphors and binders, and the dispersions are simultaneously applied on a substrate in a superposed form to obtain a molded product of multi-layer.

24. The process as claimed in claim 18, in which said phosphor layer-forming materials are powder materials comprising the stimulable phosphors, and the powder materials are charged into a molding tool one after another to obtain a molded product of multi-layer.

25. A radiation image storage panel having a sintered stimulable phosphor layer which consists essentially of a sintered stimulable phosphor, has a relative density of not less than 70%, and is binder free.

26. A radiation image storage panel having a sintered stimulable phosphor layer which consists essentially of a sintered stimulable phosphor and has a relative density of not less than 70%, in which said phosphor layer is composed of at least two layers and the relative density of each layer increases in the direction perpendicular to the panel plane toward the read out side of the panel.

27. The radiation image storage panel as claimed in claim 26, in which each of said phosphor layers contains an additive of different kind and/or in a different amount including 0 from those of the other phosphor layers.

28. The radiation image storage panel as claimed in claim 27, in which said phosphor layers are two layers, the stimulable phosphors in both the layers are divalent europium activated alkaline earth metal fluorohalide phosphors and one of the layers contains alkali metal halide.

29. The radiation image storage panel as claimed in claim 28, in which said alkali metal halide is contained in the phosphor layer in an amount of 0.01–10% by weight of the phosphor.

* * * * *